March 18, 1930. H. R. RICARDO 1,751,357
SELF ALIGNING SPHERICAL JOINT OR BEARING
Filed Jan. 14, 1925
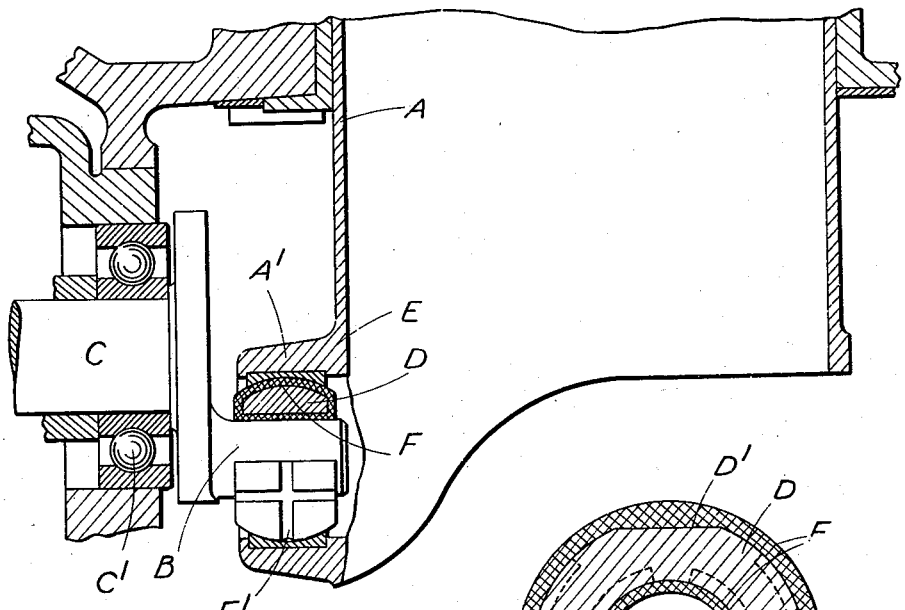
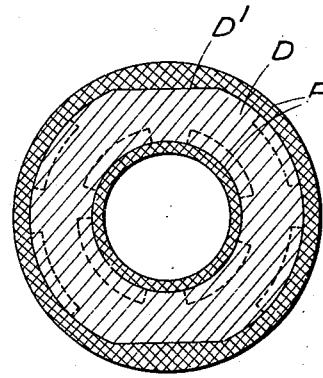
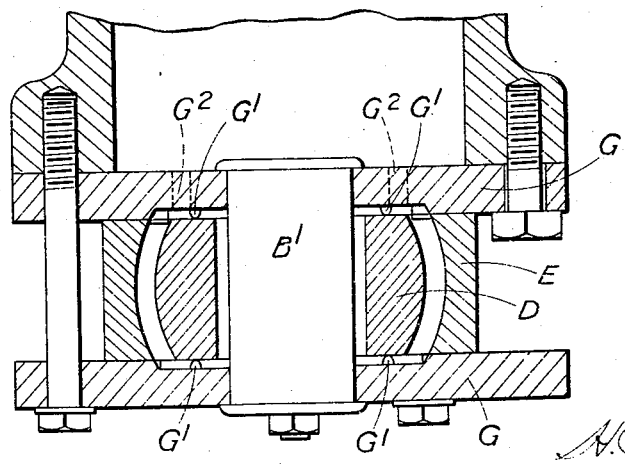

Patented Mar. 18, 1930

1,751,357

UNITED STATES PATENT OFFICE

HARRY RALPH RICARDO, OF LONDON, ENGLAND

SELF-ALIGNING SPHERICAL JOINT OR BEARING

Application filed January 14, 1925, Serial No. 2,417, and in Great Britain February 22, 1924.

This invention relates to self-aligning spherical joints or bearings and more particularly to such joints as are used in the mechanism employed to actuate the sleeve or sleeves of a sleeve valve fluid pressure engine, and has for its object to eliminate certain defects inherent in known constructions of this type.

In existing constructions of this nature in order to insert the inner member into the outer, it is necessary either to divide the outer member which is often inconvenient or to cut away the bearing surface of one of the members, the inner member being inserted approximately at right angles in the outer and then rotated into position. In such a case the bearing surface of the joint is considerably reduced. Again, in known constructions both members are normally of bronze, steel or other metal of relatively high melting point and in the event of lubrication failure a complete seizure takes place with the result that considerable damage may be done to other parts of the mechanism, more especially in the case of a sleeve valve engine.

According to this invention while the outer member is formed of a normal metal fusible at a relatively high temperature, the inner member has its spherical bearing surface formed of a metal fusible at a relatively low temperature. In a construction where the inner member of the joint is free to slide on a pin, this inner member preferably has its bearing surfaces, both that which is in contact with the outer member and that which is in contact with the pin on which the inner member slides, formed of a metal fusible at a relatively low temperature. In either case, the metal thus forming the bearing surface or surfaces of the inner member is conveniently cast in position within the outer member. An inner member comprising a body or skeleton formed of a metal fusible at a relatively high temperature may be provided and have cast thereon metal fusible at a relatively low temperature so that this latter metal constitutes the bearing surface or surfaces of the inner member. This relatively fusible metal may be cast on and around the body or skeleton while the latter is in position within the outer member. According to the method conveniently employed for this purpose in the case where the inner member is free to slide on a pin, a body or skeleton adapted to carry the metal fusible at a relatively low temperature is held in position between a dummy pin and a member formed in one piece and constituting the outer bearing member, both the outer bearing member and the body of the inner member being formed of a metal or metals fusible at a relatively high temperature. Metal which is fusible at a relatively low temperature is then poured into the spaces between the body or skeleton and the pin within it and the bearing member outside it. The body or carrier for the metal forming the bearing surface or surfaces of the inner member is conveniently constructed so that it will remain in place within the outer member even after the metal carried by this member has fused and run off it.

With such a construction an uninterrupted spherical working surface is ensured while in the event of lubrication failure, the relatively fusible metal melts and prevents seizure from occurring.

This invention may be carried out in various ways but one construction which may be adopted in the case of a spherical joint employed in the mechanism for operating the sleeve valve of a fluid pressure engine is illustrated by way of example in the accompanying drawings, in which Figure 1 is an elevation partly in section showing the improved bearing for the joint through which the sleeve valve is driven from its operating mechanism.

Figure 2 is a transverse section of the inner member of the bearing.

Figure 3 is a section illustrating the method of casting the bearing metal about the body or skeleton so as to form the inner bearing member.

The joint is of the usual form comprising an outer member carried on a lug A' formed in the lower part of the sleeve A and an inner member which can move as a ball in a socket joint within the outer member, the ball member being carried on a crank pin B on a shaft C which is mounted in bearings C' and rotated for example from the crank shaft of the engine.

According to this invention the ball member comprises a skeleton body D of annular form having a suitable cross section and dimensions and constituting a basis for the inner ball member, this body D being formed of a metal fusible at a relatively high temperature. The outer member E of the joint is formed in one piece of metal having a similar property and adapted to be mounted in some convenient manner in the lug A' of the sleeve valve. The body D is enclosed in relatively fusible metal F by casting the latter round the body so that the working surfaces of the inner member consist entirely of the relatively fusible metal, oil grooves being cut if desired in the bearing surfaces as indicated at F'. The dimensions and shape of the body D of the inner member are such that, while when turned into a suitable position, it is possible to insert the body into the outer member E, yet when in place on the crank pin B, the body can not work out of the outer member E if the relatively fusible metal between the two has run out. To this end the body D is conveniently provided with flats D' as shown in Figure 2 to permit its insertion in the outer member.

The process of casting the relatively fusible metal on and around the body D may be carried out in the following way as shown in Figure 3. The skeleton D of the inner member is placed within the outer member E of the bearing and the two are fixed between plates G which close in the sides, a dummy pin B' constituting a core being positioned in the centre so as to pass through the skeleton D and be held by the side plates G. The skeleton is positioned so as to leave clearances between it and the core pin B' and the outer member, projections G' being provided if desired to separate the plates G also from the skeleton D. Molten metal is fed conveniently under pressure through one or more openings as indicated at G² in one of the side plates G into the spaces around the skeleton, the surfaces of the outer member E and of the core pin being treated if necessary with graphite or other material so as to prevent adhesion of the metal. After the casting any "flash" or surplus metal may be removed by machining, and where such are provided, oil grooves may be cut on the working surfaces of the metal F as indicated at F' in Figure 1 by turning the inner member within the outer member until the working surface is exposed. Alternatively, suitably shaped wire or the like may be placed in the mould so as to form oil grooves the wire being removed after the casting has been effected.

Any convenient metal fusible at sufficiently low temperature for the purpose may be employed, such for example as Babbitt metal, but where the outer member E of the bearing is formed of hardened steel, as is customary, the melting point of the fusible metal must be low enough to avoid drawing the temper of the outer member of the bearing during the casting. Bronze or brass may conveniently be employed for the formation of the body or skeleton D of the inner member which carries the relatively fusible metal F.

It will be seen that with a construction according to this invention, the shrinkage of the relatively fusible metal on solidification and cooling automatically provides the desired working clearance between the spherical surfaces of the bearing while, by making the dummy pin B' of suitable size, the desired working clearance between the crank pin B and the member D can be ensured. Further, in the construction illustrated, in the event of the fusible metal F melting the skeleton or body D limits the play between the crank pin B and the outer member E of the bearing and enables the mechanism to be brought to rest without damage, the clearance between the parts, however, being sufficient to make considerable noise which gives warning that the fusible metal has run. The skeleton or body D adds strength to the inner member. If desirable, the metal of which the skeleton is formed may be directly in contact with the pin on which it works only the spherical bearing surface then being formed of relatively fusible metal, but it is preferable to form both the inner and outer bearing surfaces of metal fusible at a relatively low temperature since seizure may occur in either place and damage result.

In some cases it is possible to put a washer or the like on the end of the pin B so as to limit the movement along the pin of the inner member and in that case it is not necessary to provide against the possibility of the skeleton of the inner member tending to move in the direction of the axis of the pin if the fusible metal runs.

The invention may be applied to various mechanisms in which spherical joints or bearings of the type indicated are employed but, as indicated, it is particularly applicable to the mechanism for operating the sleeve valve of an internal combustion engine where such mechanism is designed to give to the sleeve a combined motion both in the direction of its circumference and in the direction of its axis by means of the rotating crank pin. The invention is applicable to such a mechanism whether the pin is mounted as a crank on the rotating shaft or if the pin is carried by the sleeve and the spherical joint mounted eccentrically on the rotating shaft.

The details of construction may be modified as found desirable and in accordance with the particular mechanism to which the invention is applied.

What I claim as my invention and desire to secure by Letters Patent is:—

1. In a spherical bearing, in combination, an outer formed-one-piece bearing member of high fusion point metal having an inner circumferentially complete spherical surface, and an inner bearing member having an outer circumferentially complete spherical surface in movable operative engagement with the surface of said outer bearing member, said inner bearing member including a core of high fusion point metal having an outer parti-circumferential spherical surface and a surface covering of low fusion point metal molded on the outer spherical surface of the core so as to have no movement relative thereto, said core alone being of sufficient size and configuration as to be non-removable from the outer member when moved along its own axis but to be freely removable therefrom when tilted relative thereto.

2. In a spherical bearing, in combination, an outer formed-one-piece bearing member of high fusion point metal having an inner circumferentially complete spherical surface, and an inner bearing member having an outer circumferentially complete spherical surface in movable operative engagement with the surface of said outer bearing member, said inner bearing member including a core of high fusion point metal having an outer parti-circumferential spherical surface and a surface covering of low fusion point metal molded on the outer spherical surface of the core so as to have no movement relative thereto, said inner bearing member as a complete unit being in non-removable engagement with said outer bearing member but having free rotary and rocking movement therein, said core alone being of sufficient size and configuration as to be non-removable from the outer member when moved along its own axis but to be freely removable therefrom when tilted relative thereto.

3. In a spherical bearing, in combination, an outer formed-one-piece bearing member of high fusion point metal having an inner circumferentially complete spherical surface, and an inner bearing member having an outer circumferentially complete spherical surface movable in operative engagement with the surface of said outer bearing member and having an axial cylindrical bore therethrough, said inner bearing member including a core of high fusion point metal having an outer parti-circumferential spherical surface to permit assembling the outer bearing member and inner core by tilting the latter relatively to the former, a surface covering of low fusion point metal molded on the outer spherical surface of the core so as to have no movement relative thereto and a surface covering of low fusion point metal molded on the inner cylindrical surface of the core so as to have no movement relative thereto, said surface covering having oil grooves formed on its spherical outer surface.

4. In a spherical bearing, the combination with an outer annular one-piece bearing member of high fusion point metal having a spherical inner surface, of an inner bearing member having an outer circumferentially complete spherical bearing surface operatively engaged with the inner surface of the outer bearing member, said inner bearing member comprising a core of high fusion point metal having an outer surface so shaped and dimensioned as to permit assembling said core within said outer bearing member by tilting the former with respect to the latter while preventing withdrawal of said core when the latter occupies its normal operative position relative to the outer bearing member, and a surface covering of low fusion point metal molded on the outer surface of the core, whereby on overheating of the bearing and resultant melting of the low fusion point covering, the inner and outer members are prevented from disengaging.

In testimony whereof I have signed my name to this specification.

HARRY RALPH RICARDO.